United States Patent [19]

Moessner et al.

[11] B 3,924,822

[45] Dec. 9, 1975

[54] CARTRIDGE FOR RECORDING MEDIA

[75] Inventors: Manfred Moessner, Eppelheim; Gerhard Kreutze, Bammental, both of Germany

[73] Assignee: Badische Anilin- & Soda-Fabrik Aktiengellschaft, Ludwigshafen (Rhine), Germany

[22] Filed: Mar. 8, 1973

[21] Appl. No.: 339,059

[44] Published under the Trial Voluntary Protest Program on January 28, 1975 as document no. B 339,059.

[30] Foreign Application Priority Data

Mar. 13, 1972 Germany........................7209493

[52] U.S. Cl..................................... 242/198; 352/72

[51] Int. Cl.$^2$. G03b 1/04; G11b 15/32; G11b 23/04

[58] Field of Search.................... 242/180, 197–200, 242/76; 312/229; 43/114, 115; 179/100.2 Z; 274/4 B, 4 C, 11 B, 11 C; 352/72–78; 15/104

[56] References Cited

UNITED STATES PATENTS

| | | | |
|---|---|---|---|
| 2,676,766 | 4/1954 | Ross et al. | 242/76 |
| 2,911,756 | 11/1959 | Geary | 43/114 |
| 3,148,398 | 9/1964 | Thomas, Jr. | 15/104 |
| 3,156,424 | 11/1964 | Namenyi-Katz | 242/180 |
| 3,692,956 | 9/1972 | Northrup | 179/100.2 Z |
| 3,751,043 | 8/1973 | Bracci | 274/4 C |

*Primary Examiner*—Leonard D. Christian
*Attorney, Agent, or Firm*—Johnston, Keil, Thompson & Shurtleff

[57] ABSTRACT

A cartridge for recording media in the form of strip material, particularly a cartridge for use on teaching machines, having an opening for admitting a member for actuating cartridge-locking and unlocking means, which member is mounted on the machine for receiving the cartridge, said opening permitting the cartridge to be locked on or unlocked and removed from the machine in an extremely simple manner by mere operation of the said member, and having resilient elements which hold the recording media immobile during transportation of the cartridge and immediately after the latter has been unlocked and removed from the said machine. The cartridge can be used with advantage for both films and magnetic tapes.

7 Claims, 3 Drawing Figures

CARTRIDGE FOR RECORDING MEDIA

Figures 1, 2, 3:
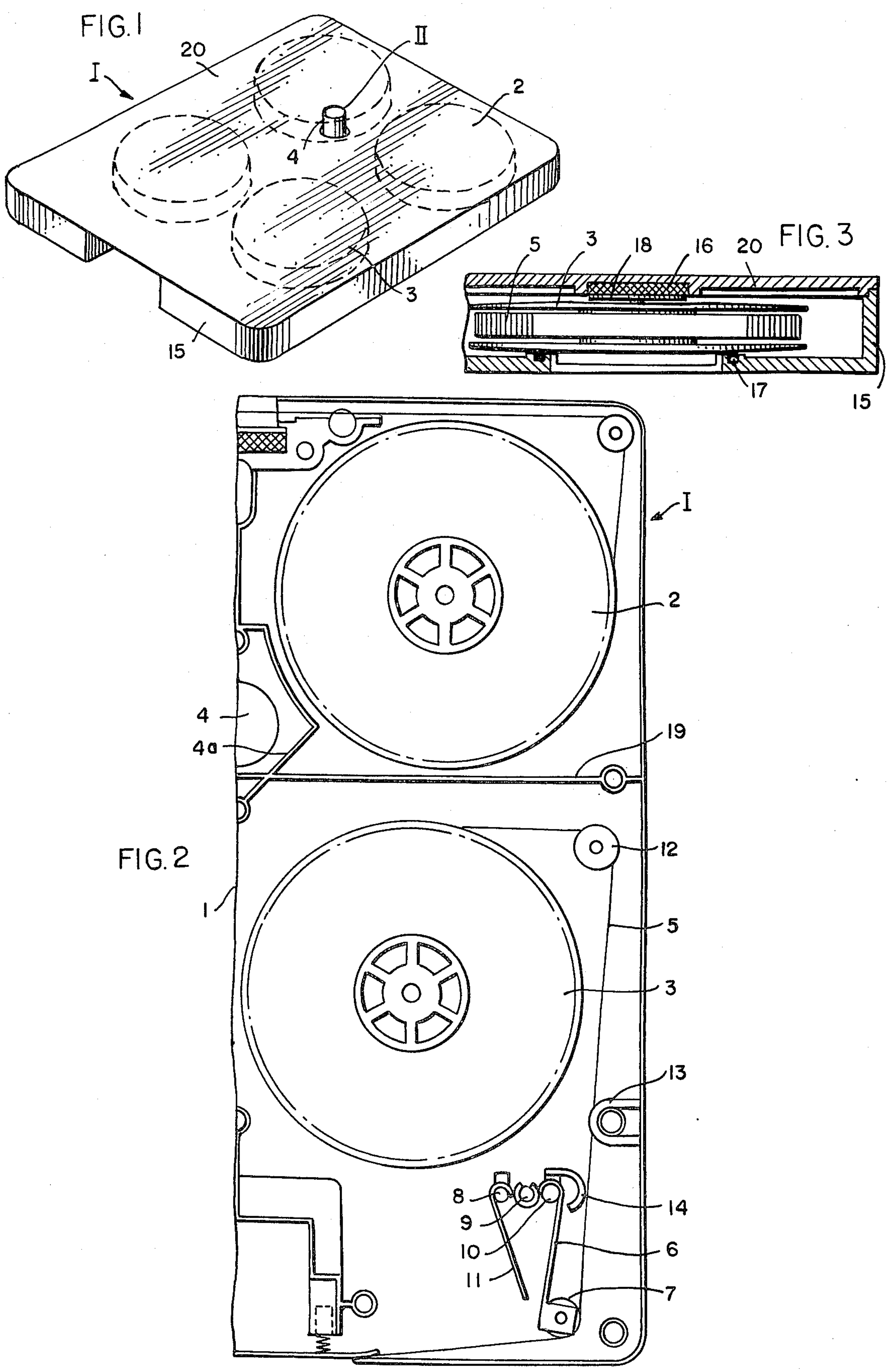

The present invention relates to a cartridge for recording media in the form of strip material which for operation can be locked on recording and/or playback apparatus, particularly to a combination cartridge for a film and a magnetic tape which can be moved independently of one another, the spools for the two recording media being substantially in the same plane.

Such cartridges should be able to be changed easily and quickly. At the same time the cartridge, during operation, must be not only firmly locked on the recording and/or playback apparatus but also fixed in a precisely defined position.

The scanning means, e.g. the magnetic head, which enter the cartridge during operation must be in a retracted position when the cartridge is inserted or removed. If not, the recording media may be damaged or destroyed and, in addition, the scanning means which are usually sensitive may be put out of alignment, damaged or destroyed.

Conventional cartridges of this type are difficult to change or there is a risk that they may be incorrectly handled with the result that the recording and/or playback apparatus and the recording media may be damaged.

Moreover, conventional cartridges do not permit sufficiently rapid forward wind and sufficiently rapid rewind and at the same time simultaneous scanning of the recording media, which is required in the case of teaching machines for example.

According to the present invention these disadvantages are overcome by providing an opening in the top and bottom of the cartridge, which openings are opposite each other and into one of which there projects a member mounted on the recording and/or playback apparatus for actuating cartridge-locking and/or unlocking means or through both of which said member extends.

The cartridge of the invention can be inserted into or removed from the apparatus by actuating the said member, e.g. by depressing a push button. The openings facilitate insertion and removal of the cartridge.

In a further embodiment of the invention all spools inside the cartridge are automatically prevented by resilient members from moving and rotating during transportation and when the cartridge is removed from the recording and/or playback apparatus.

This is achieved according to the invention by associating a resilient member with each spool, by means of which each spool is automatically urged against an annular braking member arranged between the bottom wall of the cartridge housing and each spool.

Further details of the invention are disclosed in the following description of one embodiment of the cartridge illustrated in the accompanying drawings, in which FIG. 1 is a perspective diagrammatic view of a cartridge according to the invention, FIG. 2 is a plan view of one half of an open cartridge shown in FIG. 1, and FIG. 3 is a cross-sectional view of part of the cartridge shown in FIG. 1.

The cartridge I comprises a bottom part 15 and a top part 20. A circular hole 4 is provided in the top and bottom walls of the cartridge housing. A member II which is mounted for instance on a playback apparatus and cooperates with cartridge-locking and/or unlocking means on the apparatus enters hole 4.

In FIG. 2, only one half of the cartridge of FIG. 1 is shown because the cartridge is constructed substantially symmetrically with respect to line 1.

There is provided in the bottom wall of the cartridge between the pair of flanged tape spools 2 and the pair of flanged film spools 3 a hole 4 opposite which a corresponding hole is arranged in the top wall of the cartridge. The pairs of spools 2 and 3 are substantially coplanar.

To prevent the jerky motion of the film 5 being transferred to the film spools 3, springs 6 are arranged in front of them, these springs 6 being provided at their free ends with guide members 7 which are made of, for example, a suitable plastics material and over which the film travels. The other free end 11 of spring 6 held by pins 8, 9 and 10 serves as a resilient stop which comes into action when the end of spring 6 bearing guide member 7 is bent back too far toward the inside of the cartridge when the film is transported at high speed with a non-jerky motion.

To avoid the use of noisy rolls, the film is guided over fixed guide elements, namely guide pins 12 and guide members 13 and 14.

FIG. 3 is a cross-sectional view of part of the cartridge I of FIG. 1 taken on the axis of spool 3.

The resilient elements which automatically urge the spools 2 and 3 against the annular braking members 17 arranged between the bottom wall of the cartridge housing and spools 2 and 3 when the cartridge is removed from the playback apparatus may, as shown in the drawing, consist of a resilient disc 16 of expanded plastics material, foam rubber or the like and a metal disc 18.

When the cartridge is inserted in the playback apparatus, winding spindles for spools 2 and 3 lift them away from the annular braking members 17. The resilient elements urge spools 2 and 3 against the supports on the winding spindles and thus ensure that the spools are correctly positioned as regards height and rotate truly.

Since the spools in cartridges used in teaching machines are usually not changed and the cartridges are therefore not opened, dust and wear products collect inside the cartridge after prolonged operation. These particles which can cause a marked reduction in the quality of the projected image in particular are whirled about inside the cartridge by the recording media when they are transported at high speed. This disturbance can be avoided by providing at least part of the inside of the cartridge, for example wall 19 which divides the cartridge into two compartments, one for tape spools 2 and the other for film spools 3, with means for binding the wear products and/or dust, for example with double-coated adhesive tape. It is however also possible to provide all inside surfaces of the cartridge housing with, for example, replaceable adhesive means.

In an advantageous embodiment of the invention the inside of the cartridge I can be separated from the openings 4 by a continuous wall 4*a*, the greatest possible protection against the ingress of dust from outside thus being ensured.

While the invention has been particularly shown and described with reference to a preferred embodiment thereof, it will be understood by those skilled in the art that other changes in the form and details may be made without departing from the spirit and scope of the invention.

We claim:

1. For use in connection with a recording and/or playback apparatus of the type having driving means including spindles, having recording-media-scanning means and having a cartridge-locking and/or -unlocking mechanism controlled by a manually operable member, a cartridge having a substantially rectangular housing with a bottom wall, a top wall and side walls, two pairs of spools designed to carry packs of recording media in the form of strips, the first for the recording of visual information and the second for the recording of audio information, and means for guiding said strips, at least one of said side walls having apertures designed to permit passage therethrough of said scanning means and said bottom and top walls having mutually facing openings disposed between the locations of said spools and said strips and designed so that, with the cartridge placed in position on said apparatus, said member projects through at least one of said openings and is accessible for manual operation from outside of said apparatus and said cartridge.

2. A cartridge for use in connection with a recording and/or playback apparatus as claimed in claim 1, wherein said mutually facing openings are separated from the inside of the cartridge by a continuous wall.

3. A cartridge for use in connection with a recording and/or playback teaching apparatus as claimed in claim 1 wherein the first recording strip is a movie film and the second recording strip is a magnetic tape.

4. A cartridge for use in connection with a recording and/or playback teaching apparatus as claimed in claim 3, wherein there is provided a compartment for said film and a compartment for said magnetic tape, said compartments being separated from one another by a wall.

5. A cartridge for use in connection with a recording and/or playback teaching apparatus as claimed in claim 4, wherein said mutually facing openings are arranged in one of the said compartments.

6. A cartridge for use in connection with a recording and/or playback apparatus as claimed in claim 1, wherein said cartridge comprises, disposed in cooperating relationship with each of said spools, a resilient member and an annular braking member, each said braking member being positioned between the corresponding spool and the bottom wall of the cartridge housing, so that each said spool is automatically urged against the corresponding braking member with said cartridge removed from the said apparatus.

7. A cartridge for use in connection with a recording and/or playback apparatus as claimed in claim 1, wherein at least part of the inside of the housing is provided with means for binding wear products and/or dust.

* * * * *